May 13, 1947.  N. B. STRACHOVSKY  2,420,452
RESILIENT MOUNTING
Filed Oct. 2, 1944  2 Sheets-Sheet 1

Inventor
Nikita B Strachovsky
By Ralph Hamma
Attorney

May 13, 1947.  N. B. STRACHOVSKY  2,420,452
RESILIENT MOUNTING
Filed Oct. 2, 1944  2 Sheets-Sheet 2

Inventor
Nikita B Strachovsky
By Ralph Hammar
Attorney

Patented May 13, 1947

2,420,452

UNITED STATES PATENT OFFICE 2,420,452

RESILIENT MOUNTING

Nikita B. Strachovsky, Erie, Pa., assignor to Lord Manufacturing Company, Erie, Pa., a corporation of Pennsylvania Application October 2, 1944, Serial No. 556,759

6 Claims. (Cl. 248—5)

The present invention relates to resilient mountings of the type suitable for aircraft engines having springs and hydraulic dampers arranged between a hub and an enclosing case.

The object of my invention is to provide a simple and compact construction having substantially constant operating characteristics. Further objects and advantages appear in the specification and claims.

Figure 1:
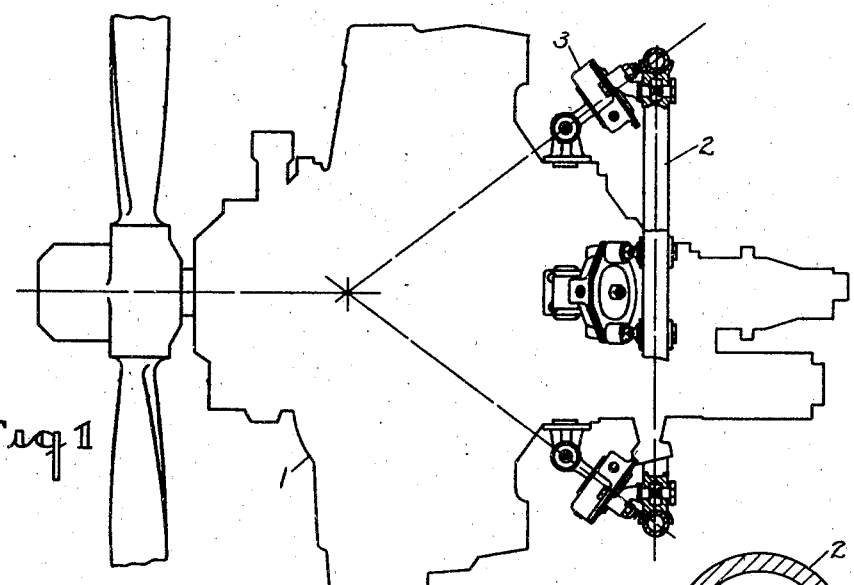
Figure 2:
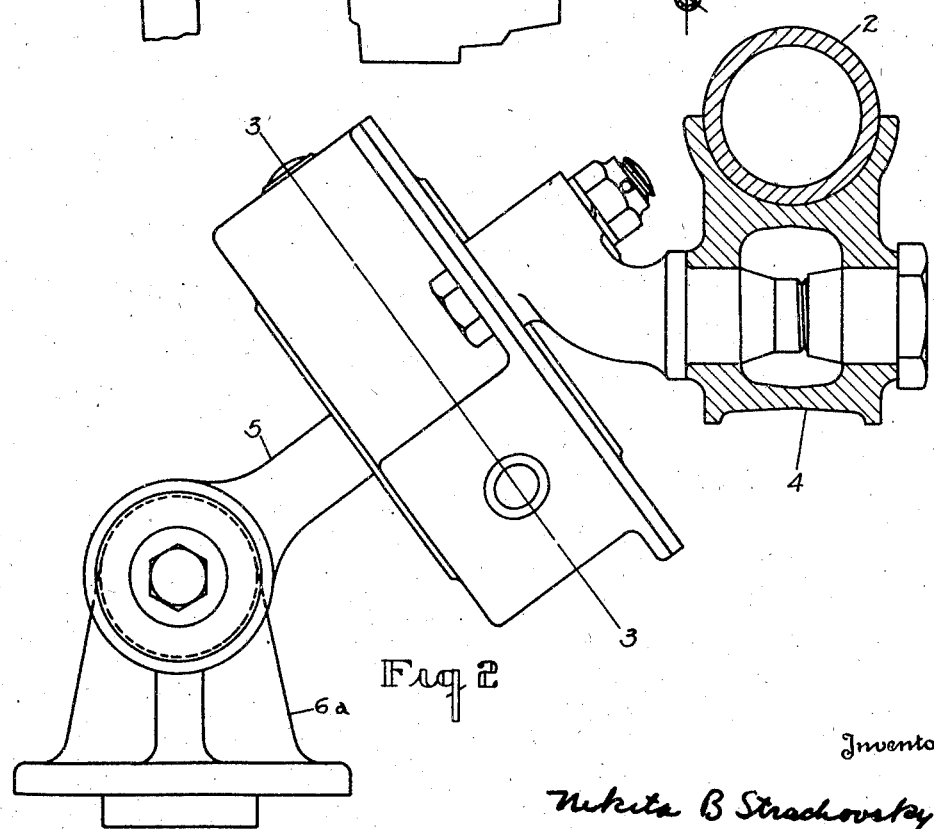
Figure 3:
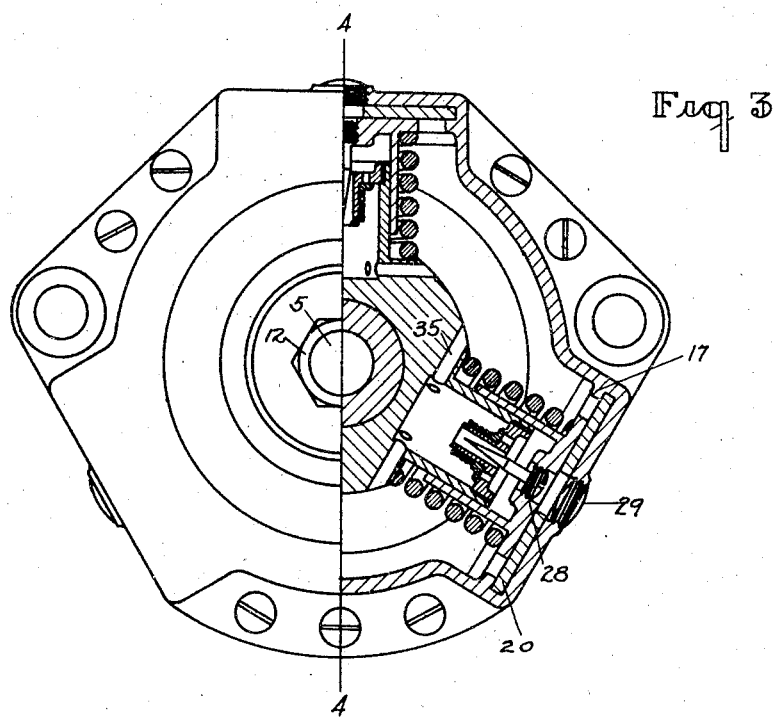
Figure 4:
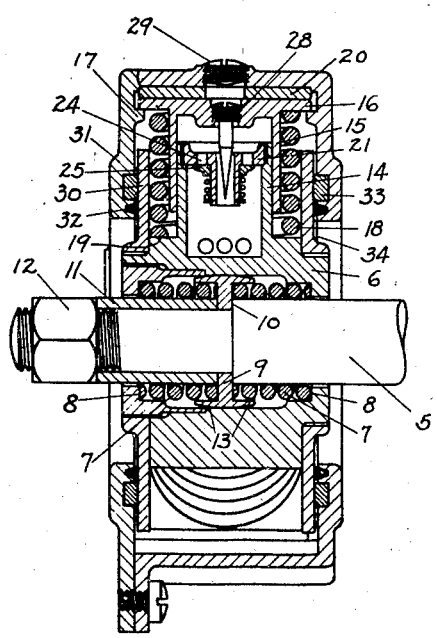
Figure 5:
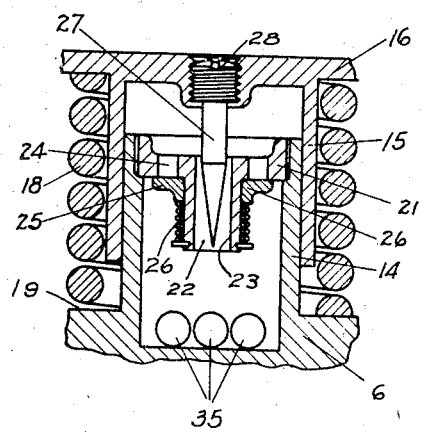

In the accompanying drawings, Fig. 1 is a side elevation of an aircraft engine supported by resilient mountings embodying my invention; Fig. 2 is an enlarged view of one of the mountings; Fig. 3 is a partial sectional view on line 3—3 of Fig. 2; Fig. 4 is a sectional view on line 4—4 of Fig. 3; and Fig. 5 is an enlarged view of the spring and hydraulic damper.

Referring to the drawings, the mountings are shown applied to a radial aircraft engine 1 having a mounting ring 2 to which the mountings 3 are fastened by brackets 4. The connection between the mountings and the engine is made by rods 5 pivoted on brackets 6a fixed to the engine. As is customary in this type of mounting, the axes of the rods 5 intersect the axis of the engine at a point ahead of its center of gravity located so the engine is effectively supported at its center of gravity for movement in all directions. The operation of this type of mounting is well understood.

Each of the mountings 3 has a hub 6 surrounding the rod 5 and resiliently centered on the rod by springs 7 arranged between shoulders 8 on the hub and a collar 9 held against a shoulder 10 on the rod by a spacer 11. The spacer is locked in place on the rod by a nut 12. The collar 9 is provided with flanges 13 which serve as seats for the springs and the outer part of which is slidably guided in the hub.

Integral with the hub are radially projecting hollow pistons 14 over which are telescoped cylinders 15 having guide flanges 16 received in guides 17. Surrounding the cylinders are compression springs 18 arranged between the flanges 16 and seats 19 on the hub. The springs 18 center the hub with respect to the casing and offer substantially uniform resistance to movement of the hub in any direction in the plane of the springs. As is apparent from Fig. 3, movement of the hub in the direction to compress one of the springs 18 will necessarily result in a lateral displacement of the other cylinders which is permitted by the guides 17. Bearing plates 20 are arranged between the ends of the cylinders and the casing to reduce the sliding friction.

The pistons are provided with heads 21 having a central port 22 provided by a sleeve 23 and having around the sleeve ports 24 closed by a check valve 25 which is normally held in the closed position by a spring 26. Cooperating with the port 22 is a needle valve 27 integral with a screw 28 threaded in the cylinder head. In the central position of the hub the needle valve is adjusted to partially close the port 22. The restriction of the port depends upon the relative position of the piston and cylinder. In the ends of the casing opposite the needle valves are screws 29 which, when removed, permit adjustment or replacement of the needle valves.

At the ends of the hub are flanges 30 slidably bearing against the end walls 31 of the casing in which are carried sealing rings 32 and bearing rings 33. The end walls of the casing are provided with clearance openings 34 which permit the necessary radial movement of the hub. The casing is filled with a suitable damping fluid and ports 35 are provided in the lower ends of the pistons for the fluid displaced by relative movement of the pistons and cylinders.

As one of the pistons approaches its cylinder, the check valve 25 is moved away from the ports 24 to decrease the resistance. At the same time the needle valve 27 enters the port 22. Upon movement of the piston in the reverse direction, the check valve closes the ports 24 and the necessary flow of fluid into the space between the piston and cylinder is through the port 22 restricted by the needle valve. For large deflections the resistance to the flow of fluid is increased with a corresponding increase in the hydraulic damping.

In the operation, axial vibrations of the engine are cushioned by the springs 7 and torsional and radial vibrations of the engine are cushioned by the springs 18. The torsional and radial vibrations which cause displacement of the hub 6 in the plane of the springs 18, are hydraulically damped by the flow of the damping fluid through the restricted ports controlled by the needle valves 27. The needle valves are adjusted to offer a maximum resistance when the associated piston is moved from the central position in the direction to compress the springs 18 and a gradually decreasing resistance when the piston is moved in the opposite direction. The damping effect may be modified by changing the position and proportions of the needle valves.

What I claim as new is:

1. In a resilient mounting, a hub having circumferentially spaced radially projecting pistons, cylinders telescoped over the outer ends of the pistons, compression springs operating between the pistons and cylinders, a fluid filled casing enclosing the cylinders and having guides permitting circumferential sliding of the cylinders relative to the casing, said casing providing a closed circuit for the fluid displaced by relative movement of the cylinders and pistons, and a restricted port in said circuit.

2. In a resilient mounting, a hub having circumferentially spaced radially projecting pistons, cylinders telescoped over the outer ends of the pistons, guides perpendicular to the pistons for retaining the cylinders in planes a fixed distance from the mean position of the hub, and compression springs operating between the pistons and cylinders.

3. In a resilient mounting, a hub having circumferentially spaced radially projecting pistons, cylinders telescoped over the outer ends of the pistons, compression springs operating between the pistons and cylinders, a fluid filled casing enclosing the cylinders and having guides permitting circumferential sliding of the cylinders relative to the casing, said casing providing a closed fluid circuit for the pistons and cylinders, and restricted ports for the fluid displaced by relative movement of the cylinders and pistons, one of which comprises a needle valve controlling the restriction of the port in accordance with the relative position of the piston and cylinder.

4. In a resilient mounting, a hub having circumferentially spaced radially projecting pistons, cylinders telescoped over the outer ends of the pistons, compression springs operating between the pistons and cylinders, a fluid filled casing enclosing the cylinders and having guides permitting circumferential sliding of the cylinders relative to the casing, restricted ports for the fluid displaced by relative movement of the cylinders and pistons, one of which comprises a port in a piston head and a valve member carried by the associated cylinder for restricting the port in accordance with the relative position of the piston and cylinder.

5. In an airplane engine mounting, a rod for attachment with an engine so as to intersect the longitudinal axis of the engine at a point spaced from its center of gravity, a fluid filled casing perpendicular to the rod for attachment to an engine mounting ring, a hub rotatably carried in the casing, springs centering the rod in the hub, circumferentially spaced radial pistons on the hub, cylinders telescoped over the outer ends of the pistons, guides on the casing holding the cylinders, springs operating between the pistons and cylinders, and restricted ports within the casing for fluid displaced by relative movement of the pistons and cylinders.

6. In a resilient mounting, relatively movable parts comprising circumferentially spaced radial pistons and cylinders, compression springs operating between the parts, attaching means for the parts comprising a hub fixed to one of the parts and a fluid filled casing having guides permitting circumferential movement of the other of the parts relative to the casing and providing a closed fluid circuit for the pistons and cylinders, and restricted ports in said circuit for the fluid displaced by the pistons and cylinders.

NIKITA B. STRACHOVSKY.

REFERENCES CITED

The following references are of record in the file of this patent:

UNITED STATES PATENTS

| Number | Name | Date |
| --- | --- | --- |
| 1,871,030 | Bommer | Aug. 9, 1932 |